United States Patent
Baratta et al.

(10) Patent No.: US 8,347,873 B2
(45) Date of Patent: Jan. 8, 2013

(54) HEAT REDUCING SLOT ON A CARBIDE PLATE AND METHOD OF USE THEREOF

(75) Inventors: Anthony Baratta, Oak Park, CA (US); Kevin Baron, Camarillo, CA (US); Kraig Baron, Dos Vientos Ranch, CA (US)

(73) Assignee: Western Saw, Oxnard, CA (US)

( * ) Notice: Subject to any disclaimer, the term of this patent is extended or adjusted under 35 U.S.C. 154(b) by 730 days.

(21) Appl. No.: 12/459,696

(22) Filed: Jul. 6, 2009

(65) Prior Publication Data

US 2011/0000475 A1    Jan. 6, 2011

(51) Int. Cl.
*B28D 1/04* (2006.01)
(52) U.S. Cl. .......... 125/15; 83/676; 125/13.01; 451/449
(58) Field of Classification Search ............ 83/676, 83/835, 839, 840; 125/13.01, 15, 18, 19; 451/449, 540, 541, 542, 544, 547, 488
See application file for complete search history.

(56) References Cited

U.S. PATENT DOCUMENTS

| | | | | |
|---|---|---|---|---|
| 3,730,038 A * | 5/1973 | Farb | .............. | 83/837 |
| 4,462,382 A * | 7/1984 | Baron et al. | .............. | 125/15 |
| 4,516,560 A * | 5/1985 | Cruickshank et al. | .............. | 125/15 |
| 4,583,515 A * | 4/1986 | Ballenger | .............. | 125/15 |
| D345,683 S * | 4/1994 | Johnston | .............. | D8/70 |
| 5,524,518 A * | 6/1996 | Sundstrom | .............. | 83/845 |
| 5,555,788 A * | 9/1996 | Gakhar et al. | .............. | 83/835 |
| 5,839,423 A * | 11/1998 | Jones et al. | .............. | 125/15 |
| 6,408,838 B1 * | 6/2002 | Ogata et al. | .............. | 125/15 |
| 7,156,010 B2 * | 1/2007 | Asada | .............. | 83/835 |
| 2003/0061920 A1 * | 4/2003 | Thompson | .............. | 83/13 |

* cited by examiner

*Primary Examiner* — Timothy V Eley
(74) *Attorney, Agent, or Firm* — Sandy Lipkin

(57) ABSTRACT

A heat reducing slot that is part of a saw blade that includes tips that will house carbide or other tips that are to be attached through a torch or induction. Heat reducing slots repeat for each tip on the perimeter of a blade that will be treated with high heat. For each tip, there is a general area defined near the seat and groove of the tip. In this general area a slot is inserted that has the effect of reducing the amount of heat needed to be applied to the blade for the attachment of carbide or other tips.

4 Claims, 3 Drawing Sheets

HEAT REDUCING SLOT ON A CARBIDE PLATE AND METHOD OF USE THEREOF

BACKGROUND OF THE INVENTION

1. Field of the Invention

The field of this invention relates generally toward cutting blades for saws and particularly toward a specialized slot cut into the perimeter of the plate in a repeating mode that provides a method of reducing the heat transfer to the plate when carbide or other heat-applied tips are added thereto.

2. Description of the Prior Art

Circular saw blades typically have a series of tips around the perimeter that are reinforced with a cutting material to aid with the cutting of hard surfaces, such as concrete and the like. These tips are cut into the plate and reinforced with a strong cutting material, such as diamonds or carbide, which are then added to the tips using high temperatures.

In order to attach carbide tips to the blade, the plate needs to be heated, either through a torch or through induction. The heating allows for the attachment of the tips, but can lead to problems with having to finish the product once the plate returns to room temperature. Furthermore, it is often found that the blade has changed its shape somewhat near the areas where the heat was applied.

It would be desirable to provide a method for attaching carbide tips to a saw blade that can be accomplished through a reduction of the heat effected zone and subsequent part deformation.

SUMMARY OF THE INVENTION

The instant invention seeks to isolate the heat needed to attach carbide tips to a saw blade through the use of slots added just below the seat of the tips where the carbide tips are to be attached. The addition of the slits allows for greater ease in applying the carbide tips with reduced dependence on the addition of heat and the need for refinements often needed after using heat to attach the tips.

The preferred embodiment teaches a saw blade comprising: a front face; a rear face; an arbor mount aperture extending through the front face and the rear face; a peripheral edge extending at a radius from the arbor mount; a plurality of tips extending outward from the peripheral edge wherein each of the plurality of tips includes a first side that extends upward from the peripheral edge to an apogee and then extends back down toward the peripheral edge through a second side wherein the second side terminates in a seat wherein external materials can be applied to the plurality of tips and rest on the seat; a groove that extends toward the peripheral edge that sits between the seat of one of the plurality of tips and the first side of another of the plurality of tips; and a slot extending through the front face and the rear face that is situated into each of the plurality of tips in the area proximate the seat and the groove.

The above embodiment can be further modified by defining that the slot extends from the groove in a direction substantially parallel with the seat.

An alternate embodiment teaches a method of reducing the heat applied to a saw blade when attaching carbide or other tips comprising the steps of: obtaining a saw blade, the saw blade further comprising: a front face; a rear face; an arbor mount aperture extending through the front face and the rear face; a peripheral edge extending at a radius from the arbor mount; a plurality of tips extending outward from the peripheral edge wherein each of the plurality of tips includes a first side that extends upward from the peripheral edge to an apogee and then extends back down toward the peripheral edge through a second side wherein the second side terminates in a seat wherein external materials can be applied to the plurality of tips and rest on the seat; a groove that extends toward the peripheral edge that sits between the seat of one of the plurality of tips and the first side of another of the plurality of tips; and a slot extending through the front face and the rear face that is situated into each of the plurality of tips in the area proximate the seat and the groove; obtaining a plurality of attachment tips to be attached to the plurality of tips; and applying reduced heat from conventional levels to attach the attachment tips to the plurality of tips.

The above embodiment can be further modified by defining that the slot extends from the groove in a direction substantially parallel with the seat.

DETAILED DESCRIPTION OF A PREFERRED EMBODIMENT

Figure 1:
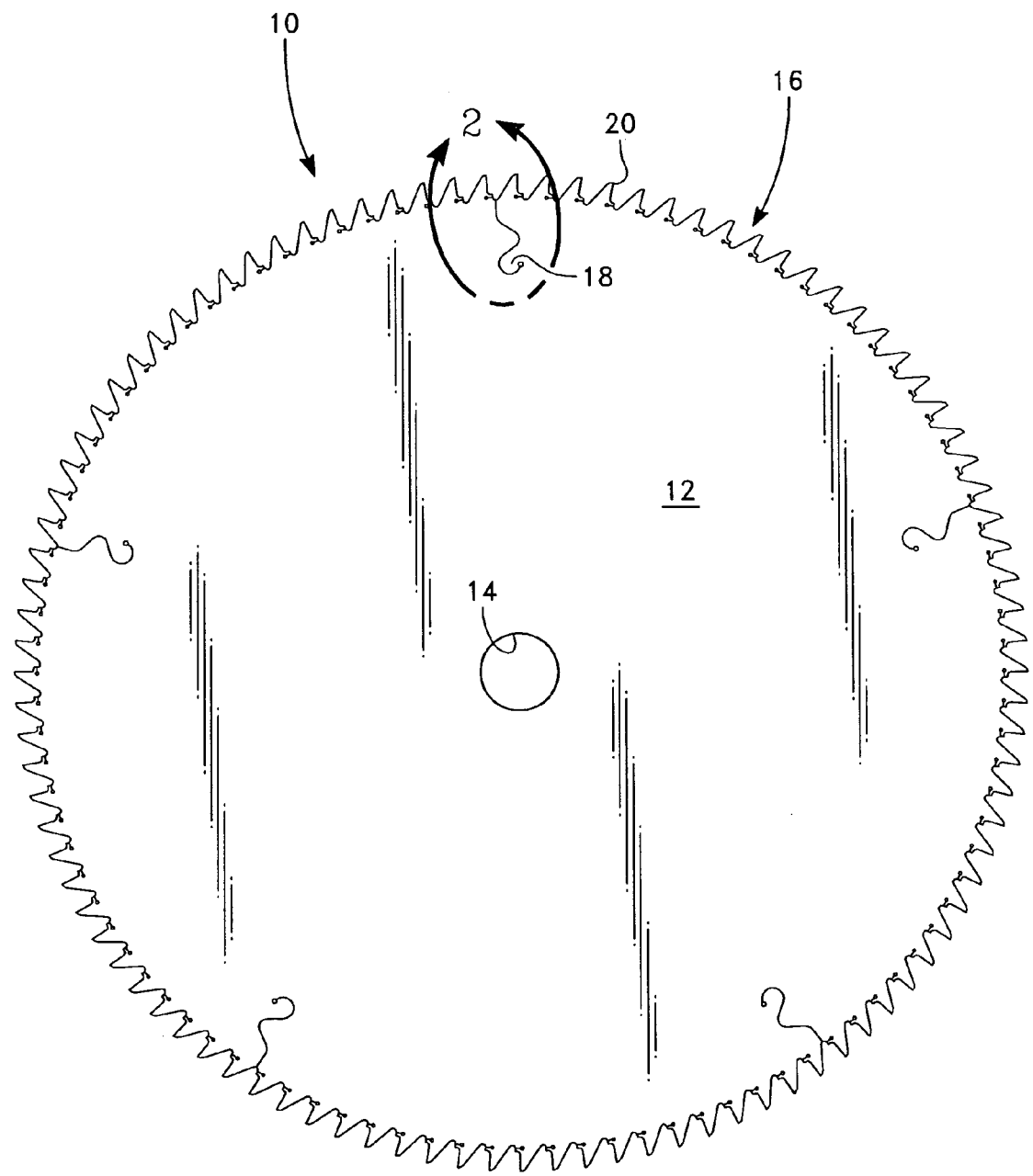
FIG. 1 is a front view of a blade with tips containing the preferred embodiment of the heat reducing slots.

Turning to the drawings, the preferred embodiment is illustrated and described by reference characters that denote similar elements throughout the several views of the instant invention.

Referring particularly to FIG. 1, it is shown a front view of a saw blade 10. The saw blade 10 is standard in that it has a front face 12 and a rear face (not shown), a center arbor mount 14 and a peripheral edge 16. Also shown in this illustration are expansion slots 18 that allow the blades to expand and contract. These are present to prevent cracking on the outer diameter after the application of heat. This is not considered novel and it is not an inventive aspect of the instant invention.

On the peripheral edge 16 is a plurality of tips 20. These tips 20 extend upward from the main portion of the blade 10 and include a seat 22 (see FIG. 2). Between the seat 22 of each tip 20 is a groove 24. It is in this groove 24 that the threat of heat-induced warp is located after the carbide tips (not shown) are fused to the blade tips 20 using the application of high external heat. The inventive aspect of the instant invention is the heat reducing slots 26 that are present in the area between the groove 24 and the seat 22. These slots 26 are often laser created, but can also be cut by water jet, machine or many other processes well known in the art. The slots 26 have the effect of reducing the amount of heat required to apply to the blade 10 and particularly toward the blade tips 20 to attach the carbide tips. The benefit is substantial in that less heat is required for attachment and less heat-caused trauma is applied to the plate 10. Additionally, the use of the heat guard is an advantage for cutting.

Figure 2:
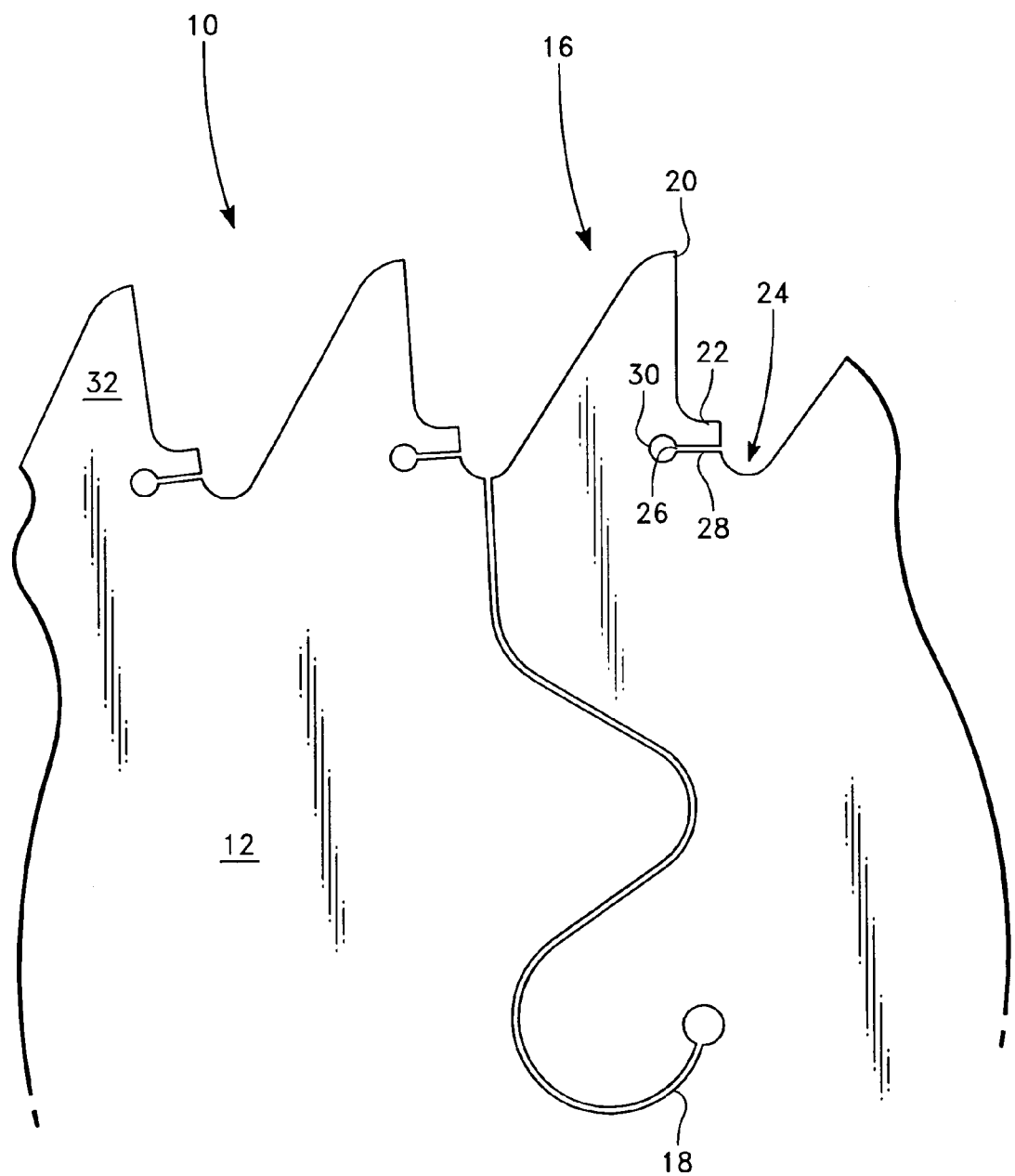
FIG. 2 is a close-up view of the area labeled 2 in FIG. 1.

The preferred embodiment of the slot is depicted in FIG. 2, which includes a straight line 28 that extends out substantially parallel to the seat 22 of the tip 20, terminating in a circular aperture 30. It is to be understood however, that the exact placement and shape of the slot is not specific, i.e., it is the location of the slot 26 proximate to the groove 24 and the seat 22 that is key to the inventive aspect of the invention. The slot 26 should cover the area generally defined as the body 32 of the tip 20 near the seat 22 and the groove 24.

Figure 3:
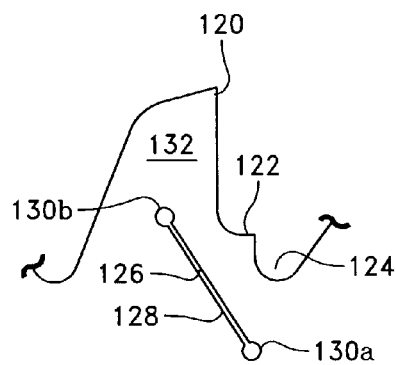
FIG. 3 is a close-up view of a first alternate embodiment of the invention.

Examples of alternate embodiments that illustrate this zone aspect of the slot are shown in FIGS. 3-8. FIG. 3 shows a close-up view of a first alternate embodiment. The blade tip 120 includes the general body area 132, the seat 122 and groove 124 of the preferred embodiment. The slot 126 is off-set from the seat 122 and groove 124, however, and runs in a direction at an angle away from the seat 122 and groove 124. This embodiment includes a straight line portion 128 terminating in circular apertures 130a,130b on either side of the straight line 128.

Figure 4:
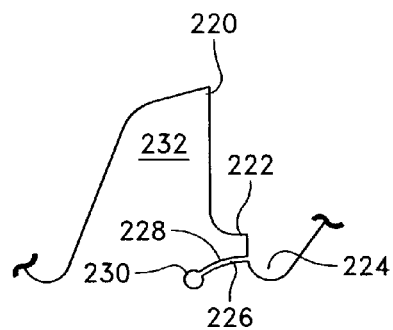
FIG. 4 is a close-up view of a second alternate embodiment of the invention.
Figure 5:
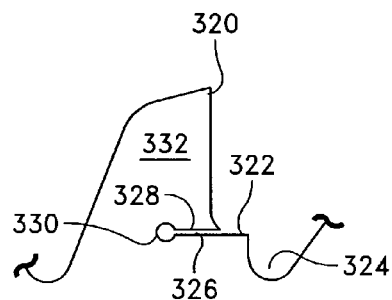
FIG. 5 is a close-up view of a third alternate embodiment of the invention.

FIG. 4 shows a second alternate embodiment with tip 220, general area 232, seat 222 and groove 224. The slot 226 extends from the groove 224 as it does in the preferred embodiment. However, the straight portion 228 that terminates in a circular hole 230 extends at angle that extends slightly downward toward the body of the blade. In FIG. 5, the third alternate embodiment has a tip 320 and general body area 332, a seat 322 and a groove 324. The slot 326 in this embodiment extends from the seat 322 itself rather than below it, as it does in the preferred embodiment. The slot 326 also includes a straight portion 328 and terminates in a circular aperture 330.

Figure 6:
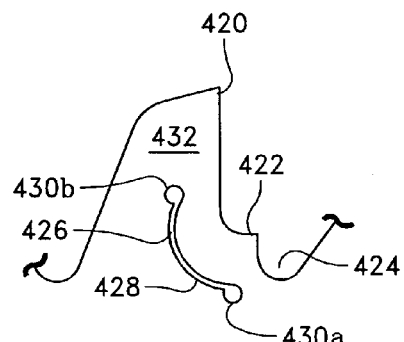
FIG. 6 is a close-up view of a fourth alternate embodiment of the invention.

FIG. 6 is very similar to FIG. 3. In this fourth alternate embodiment, there is a tip 420 and general tip area 432, a seat 422 and a groove 424. The slot 426 is off-set from the seat 422 and groove 424 area. It is curved 428 and includes circular apertures 430a,430b on each end.

Figure 7:
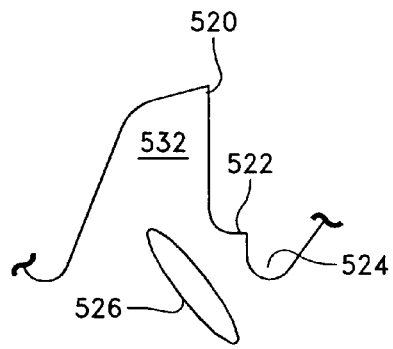
FIG. 7 is a close-up view of a fifth alternate embodiment of the invention.
Figure 8:
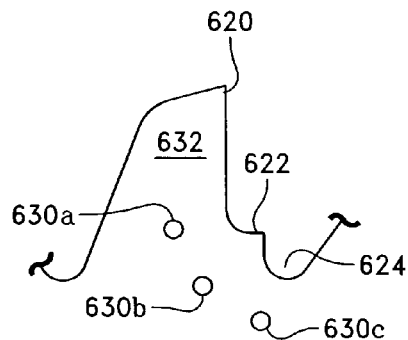
FIG. 8 is a close-up view of a sixth alternate embodiment of the invention.

FIG. 7 shows a fifth alternate embodiment that includes a tip 520, a tip area 532, a seat 522 and a groove 524. The slot 526 in this embodiment is an oval that sits in approximately the same position as the slot 126 shown in FIG. 3. The sixth alternate embodiment is shown in FIG. 8. Again, we have a tip 620, a tip area 632, a seat 622 and a groove 624. The "slots" 626a,626b,626c in this embodiment are a series of circular apertures that form a curved line, similar to the orientation shown in FIG. 6.

It is important to note that the embodiments illustrated here are not exhaustive. It is to be understood that any slot that sits in the general area defined between the seats, grooves and tips should provide the same effect as the shape and orientation shown in the preferred and alternate embodiments herein.

The discussion included in this patent is intended to serve as a basic description. The reader should be aware that the specific discussion may not explicitly describe all embodiments possible and alternatives that are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A saw blade comprising:
    a front face;
    a rear face;
    an arbor mount aperture extending through said front face and said rear face;
    a peripheral edge extending at a radius from said arbor mount aperture;
    a plurality of tips extending outward from said peripheral edge wherein each of said plurality of tips includes a first side that extends upward from said peripheral edge to an apogee and includes a second side that extends back down toward said peripheral edge wherein said second side terminates in a seat wherein external materials can be applied to said plurality of tips and rest on said seat;
    a groove that extends toward said peripheral edge that sits between said seat of one of said plurality of tips and said first side of another of said plurality of tips; and
    a slot extending through said front face and said rear face that is situated into each of said plurality of tips in the area proximate said seat and said groove.

2. A saw blade as defined in claim 1 wherein said slot extends from said groove in a direction substantially parallel with said seat.

3. A method of reducing the heat applied to a saw blade when attaching carbide or other tips comprising the steps of:
    obtaining a saw blade, said saw blade further comprising:
        a front face;
        a rear face;
        an arbor mount aperture extending through said front face and said rear face;
        a peripheral edge extending at a radius from said arbor mount aperture;
        a plurality of tips extending outward from said peripheral edge wherein each of said plurality of tips includes a first side that extends upward from said peripheral edge to an apogee and includes a second side that extends back down toward said peripheral edge wherein said second side terminates in a seat wherein external materials can be applied to said plurality of tips and rest on said seat;
        a groove that extends toward said peripheral edge that sits between said seat of one of said plurality of tips and said first side of another of said plurality of tips; and
        a slot extending through said front face and said rear face that is situated into each of said plurality of tips in the area proximate said seat and said groove;
    obtaining a plurality of attachment tips to be attached to said plurality of tips; and
    applying heat to attach said attachment tips to said plurality of tips.

4. The method as defined in claim 3 wherein said slot extends from said groove in a direction substantially parallel with said seat.

* * * * *